US011813779B2

(12) United States Patent
Claus

(10) Patent No.: US 11,813,779 B2
(45) Date of Patent: Nov. 14, 2023

(54) METHODS AND APPARATUS FOR PREPARATION OF A VULVA REPLICA

(71) Applicant: Empire Laboratories, Inc., Portland, OR (US)

(72) Inventor: David Walter Claus, Portland, OR (US)

(73) Assignee: Empire Laboratories, Inc., Portland, OR (US)

(*) Notice: Subject to any disclaimer, the term of this patent is extended or adjusted under 35 U.S.C. 154(b) by 758 days.

(21) Appl. No.: 16/837,328

(22) Filed: Apr. 1, 2020

(65) Prior Publication Data
US 2020/0307033 A1 Oct. 1, 2020

Related U.S. Application Data

(60) Provisional application No. 62/827,707, filed on Apr. 1, 2019.

(51) Int. Cl.
*B29C 33/38* (2006.01)
*A61H 19/00* (2006.01)
*B29C 39/02* (2006.01)

(52) U.S. Cl.
CPC ......... *B29C 33/3857* (2013.01); *A61H 19/32* (2013.01); *B29C 39/02* (2013.01); *B29C 2033/3871* (2013.01); *B29K 2005/00* (2013.01)

(58) Field of Classification Search
CPC ............... A61H 19/32; B29C 33/3857; B29C 2033/3871
See application file for complete search history.

(56) References Cited

U.S. PATENT DOCUMENTS

| 3,601,177 | A | | 8/1971 | Hall |
| 4,015,327 | A | | 4/1977 | McCarthy |
| 4,086,666 | A | | 5/1978 | Vaskys |
| 4,260,574 | A | | 4/1981 | Macomson |
| 4,335,067 | A | | 6/1982 | Castanis et al. |
| 4,828,116 | A | | 5/1989 | Garcia |
| 5,234,976 | A | | 8/1993 | Prent |
| 5,798,062 | A | | 8/1998 | Thielbar |
| 5,807,360 | A | * | 9/1998 | Shubin ............... A61B 10/0058 600/38 |
| 2005/0285301 | A1 | | 12/2005 | Claus et al. |
| 2006/0264856 | A1 | * | 11/2006 | Wong ..................... A61H 19/32 604/349 |
| 2012/0232335 | A1 | * | 9/2012 | Eisenberg ............... A61H 19/32 600/38 |
| 2018/0022018 | A1 | * | 1/2018 | Cambridge ........... B29C 64/153 264/308 |
| 2021/0196560 | A1 | * | 7/2021 | Liu ........................ A61H 19/32 |

* cited by examiner

Primary Examiner — Mary Lynn F Theisen
(74) Attorney, Agent, or Firm — PROCOPIO CORY HARGREAVES AND SAVITCH LLP; Pattric J. Rawlins

(57) ABSTRACT

Embodiments of the disclosed technology generally include systems and methods for the replication of a vulva. This disclosed method and system provides an option for the creation of an adult pleasure device by replication of the consumer's vulva for use by his, her, or their partner for sexual pleasure in the absence of his, her, or their partner. However, the potential applications of this invention are not limited to such use, and have many uses, such as for a keepsake, an intimate gift, or a fun experience.

10 Claims, 9 Drawing Sheets

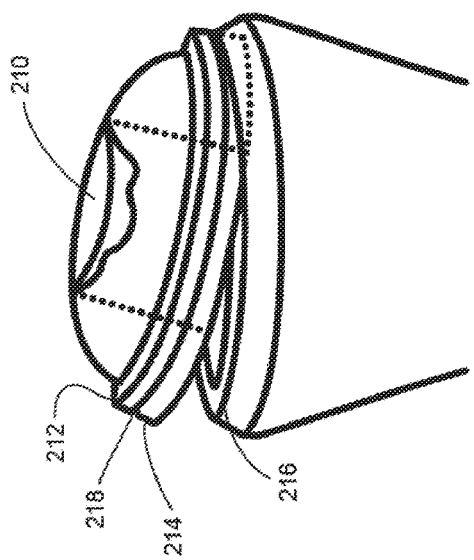
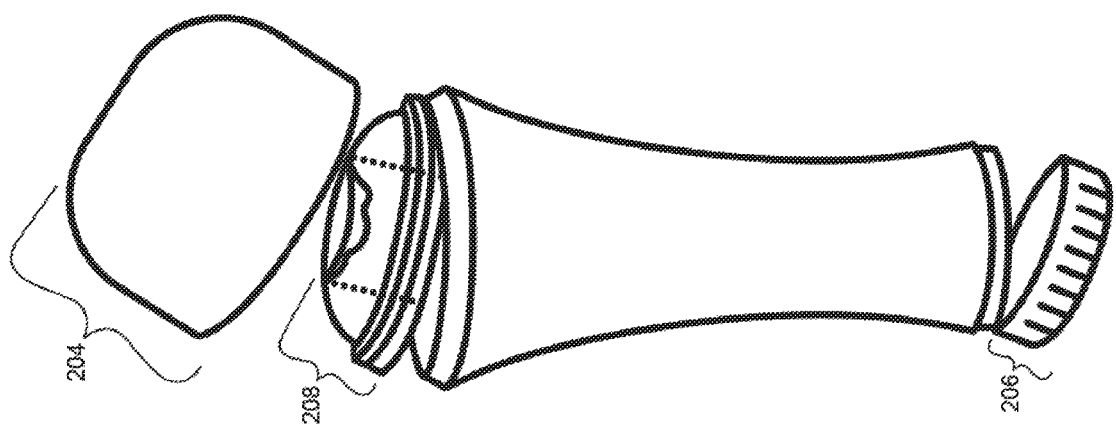
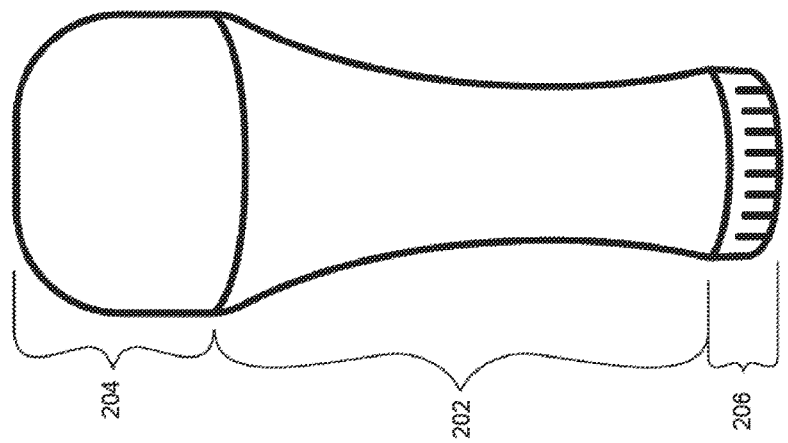

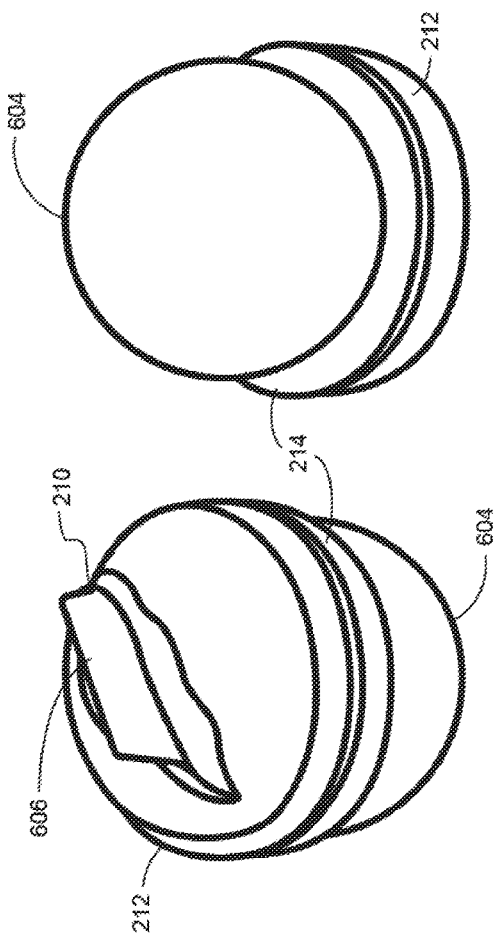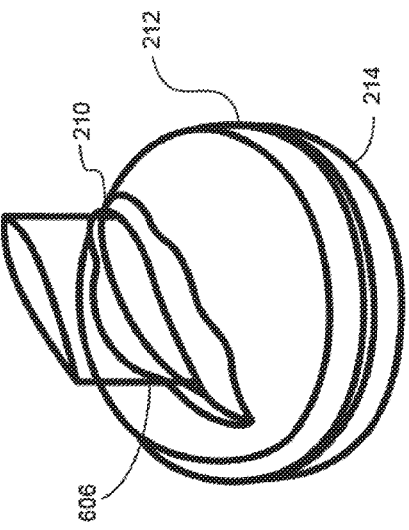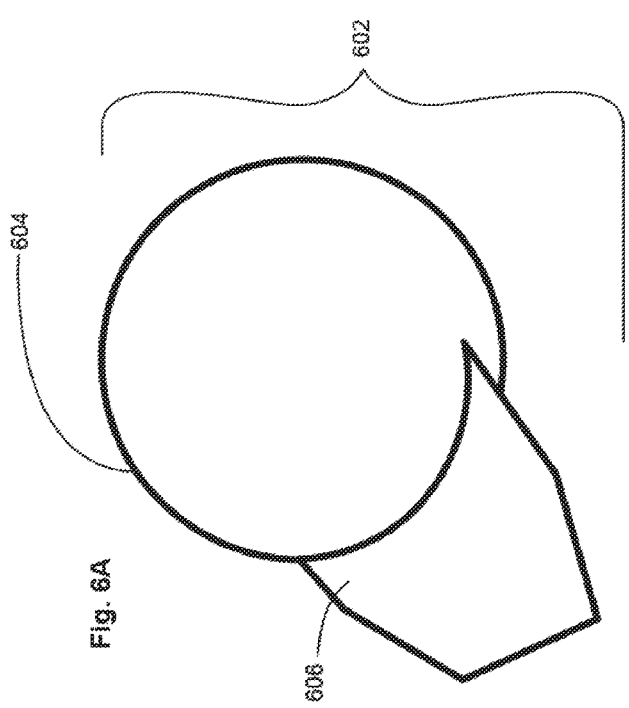

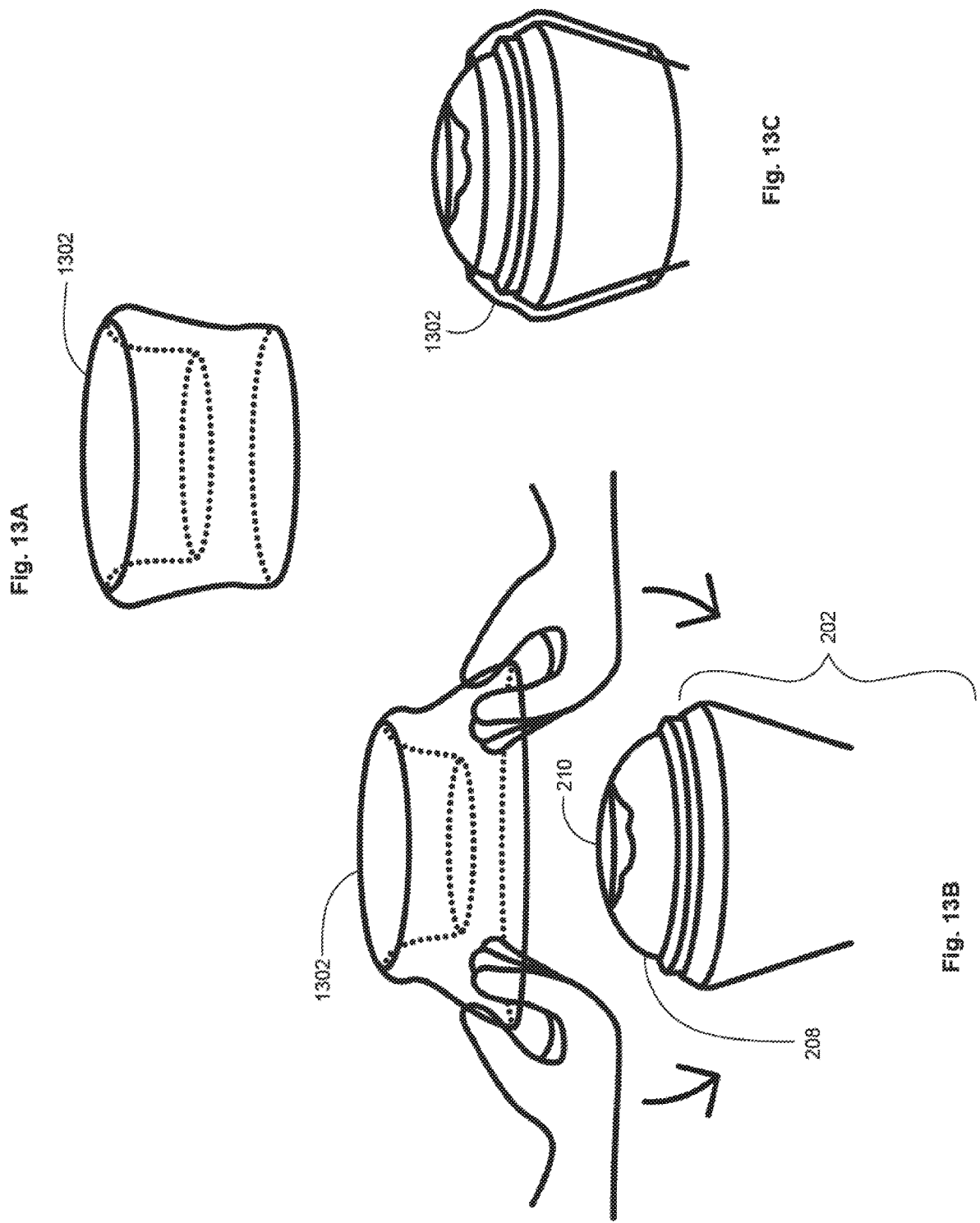

US 11,813,779 B2

METHODS AND APPARATUS FOR PREPARATION OF A VULVA REPLICA

CROSS-REFERENCE TO RELATED APPLICATION

This application claims the benefit of U.S. Provisional Application No. 62/827,707, filed Apr. 1, 2019, which is incorporated by reference herein in its entirety.

BACKGROUND

Adult pleasure devices are as old as time and come in many shapes and sizes. A consumer seeking to satisfy his, her, or their desires has a virtual plethora of options to choose from. With demand for variety comes the push for the innovation. As such, the sex toy industry is at the forefront of innovative technology. Like with many industries, progress towards customization is key. Consumers are demanding the individualization of genericized sexual products to better fit his, her, or their needs or desires.

Such customization of adult toys includes the ability to replicate a person's genitalia for the pleasure of his, her, or their partner. The inventor has developed a method and apparatus for the replication of a vulva. The replicated vulva can then be used in the absence of his, her, or their partner. Such reasons for absences include traveling, sickness, or other circumstances.

SUMMARY

An embodiment is a method of the preparation of a replica of a vulva.

An embodiment is a method of preparing an apparatus.

An embodiment is a replication apparatus comprising a molding formula, a tubular chamber, having a ridge of a certain depth, and a casting formula.

BRIEF DESCRIPTION OF THE DRAWINGS

FIG. 2A shows an illustrative embodiment of a masturbation container with a lid and a cap.

FIG. 2B shows an illustrative embodiment of a cast on one end of the masturbation container.

FIG. 2C shows an illustrative embodiment of a close-up view of a placement of a cast on one end of the masturbation container.

FIG. 6A shows an illustrative embodiment of an insert.

FIG. 6B shows an illustrative embodiment of an insert placed into a cast during formation.

FIG. 6C shows an illustrative embodiment of an insert placed into a cast during formation.

FIG. 6D shows an illustrative embodiment of an insert places into cast during formation.

FIG. 13A shows an illustrative embodiment of an optional stabilization cuff.

FIG. 13B shows an illustrative embodiment of a placement of an optional stabilization cuff.

FIG. 13C shows an illustrative embodiment of a placement of an optional stabilization cuff.

DETAILED DESCRIPTION OF THE EMBODIMENTS

Embodiments of the disclosed technology generally include systems and methods for the replication of a vulva.

One of the key features of the disclosed inventions is the method of formation of the cast. This disclosed method and system provides an option for the creation of an adult pleasure device by replication of the consumer's vulva for use by his, her, or their partner for sexual pleasure in the absence of his her, or their partner. However, the potential applications of this invention are not limited to such use, and have many uses, such as for a keepsake, an intimate gift, or a fun experience, discussed in more detail below.

Figure 1:
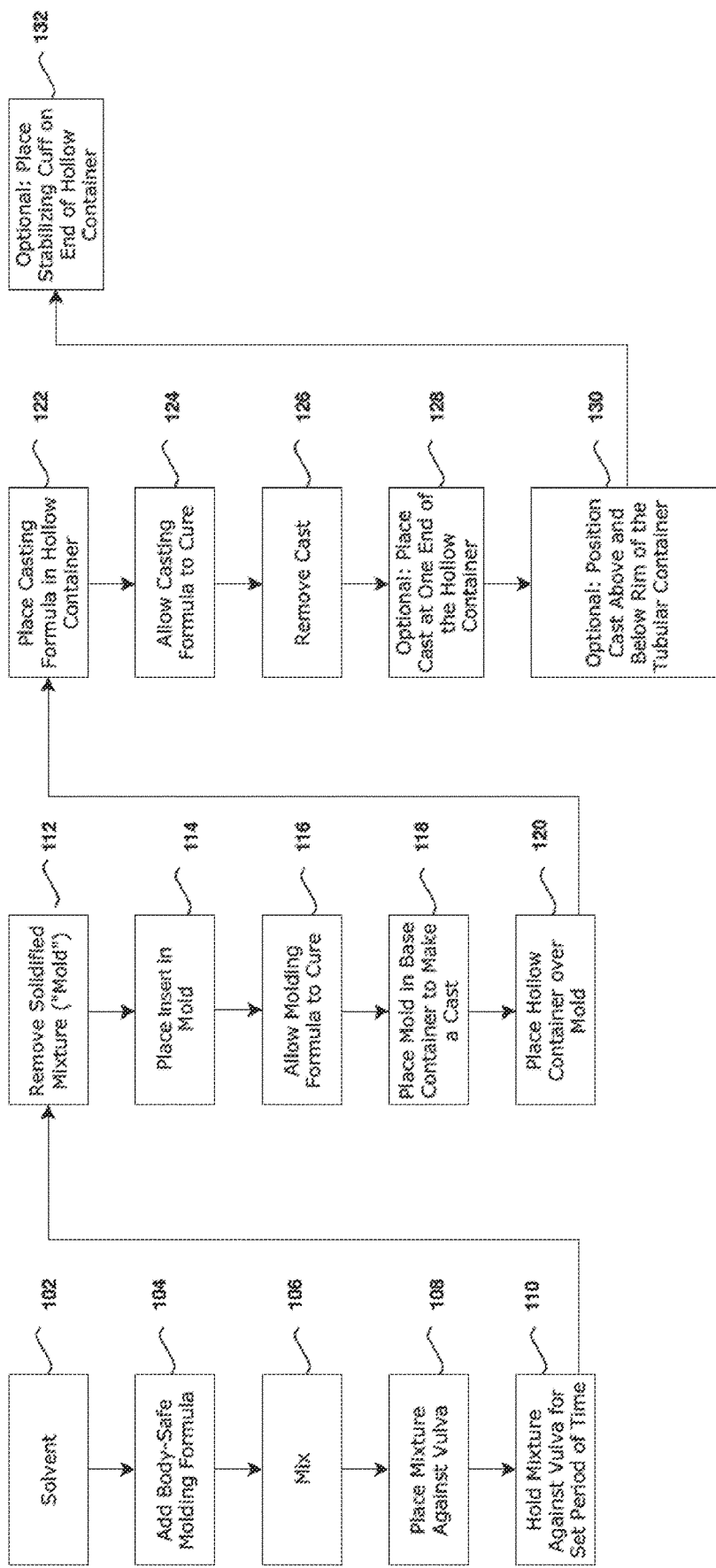
FIG. 1 shows an illustrative embodiment of a flow chart of the system and method of replicating a vulva.

FIG. 1 shows an illustrative method for replicating a vulva. One skilled in the art would recognize that the order of the steps is illustrative and may be performed in alternative sequencing. To begin the process, a solvent 102 is placed in a container. The exemplary container in this embodiment is 3½" diameter and 1⅝" height. Such solvents include any body-safe solvents, including water. The amount of solvent may vary, including in the range of 100 ml to 300 ml. In the illustrative embodiment, approximately 200 ml of solvent is placed in the container. A body-safe molding formula 104 is then added to the body-safe solvent. Such body-safe molding formulas, including but are not limited to alginate and polyether. The amount of the formula varies depending on the composition. In the illustrative embodiment, approximately 1.5 ounces of alginate is placed in water. In step 106, the formula and solvent are mixed thoroughly. The amount of time for adequate mixing is likewise dependent on the type of formula and solvent used. In this embodiment, the water and alginate are mixed for approximately 45 seconds.

At step 108, the mixture is placed against the vulva with the vaginal opening completely covered. Depending on the composition of the mixture, the time that the mixture must be held in place may vary. In this embodiment, at step 110, the mixture is to be kept in place for approximately 3 minutes. The solidified mixture or "mold" is removed from the vulva at step 112. In some embodiments, removal may require additional solvents, such as water. In the illustrative embodiment, the mold may be carefully removed with the use of a person's fingers.

At 114, for purposes of illustration, an insert is placed in the mold at the position of the vaginal opening. This exemplary insert has a ball portion and a protrusion and are described in detail below. The insert will ensure that the cast made in later steps will contain an opening in the center. This step is optional as the cast prepared at later stages may be cut or trimmed in place of the vaginal opening rather than using the above-referenced insert. The mold may be allowed to partially dehydrate in order to allow for improved mold detail at step 116. Depending on the composition, the time may vary across a wide range—0 to 24 hours. In the illustrative embodiment, the mold made from alginate and water should be allowed to cure for 4 hours.

The next steps are the preparation of a cast of the vulva using the mold prepared in the steps above. The mold is placed in a base container at step 118 to make the cast. The base container is illustratively circular in shape and connectively fits on one end of a hollow container. The base container should have the same shape as the hollow container so as to allow the two parts to connect. In the exemplary embodiment, the base container has dimensions of 3½" diameter and 2½" height. Alternatively, the container may have different shapes, including but not limited to an oval, square, or an octagon. In the illustrative embodiment, the hollow container is elongated in shape to as to allow placement of a masturbation sleeve at later steps. In alternative embodiments, the hollow container may be shorter in length to simply allow preparation of the cast. The base container and hollow container are connected by any method known to those in the art, including but not limited to snap on, screw threads, or any other means of connection.

Once the mold is placed in the base container, at step 120, the hollow container is connected to the base container. The seal between the container and the tubular container should be tight enough to prevent leakage of the casting material. However, a small amount of leakage would not inhibit the preparation of the cast.

At step 122, a casting formula is poured into the top of the tubular container, allowing the casting formula to travel to the base container where the mold is located, thereby completely covering the mold. The casting formula may be any material appropriate for forming a cast known in the industry, such as 2-part polysiloxane, polyurethane, epoxy, or polysulfide. In the embodiment illustrated herein, silicone is used to as the casting formula. The amount of casting formula used will depend on the size of the base and hollow containers used in the process. Such amounts will vary from approximately 8 to 10 ounces. In the illustrative embodiment, after pouring, the casting formula will fill the base container and travel into the hollow container over the ridge located at the opening. By allowing the casting formula to exceed the top of the base container, a space in the cast forms to connect the replica vulva via the ridge on the hollow container at later steps. In alternative embodiments, the ridge may be located in the base container. The casting formula must exceed the ridge to form the space to fit over the ridge in later steps regardless of whether the ridge is located on the base container or the hollow container.

The cast must then cure at step 124. The time will vary depending on the casting formula. The exemplary embodiment cures in approximately 8 hours. The cast is then removed at step 126.

The remaining steps create a useable masturbation device featuring the replica of the vulva created in steps 102-126. At step 128, the replica of the vulva, i.e. cast, is placed at the end of a masturbation container. The masturbation container in the illustrative embodiment is the same elongated, hollow container used in the preparation of the cast. In alternative embodiments, a separate masturbation container may be used that was not used in the casting process. However, the size and length of the ridge in both the hollow container and masturbation container should be substantially similar as to create a useable space in the cast for securing the cast to the masturbation container.

The space formed in the cast is used to secure/position the cast over the ridge at the end of the hollow container as shown at step 130. The bottom protruding rim portion of the cast is placed below the ridge and the top protruding rim portion is placed above the ridge, thereby positioning the cast on the masturbation sleeve. An optional stabilizing cuff at step 132 is placed over the same end of the masturbation container and cast of the vulva for stabilization during masturbation. An optional masturbation sleeve may be placed into the masturbation container to heighten the user's experience. Masturbation sleeves may be composed of a thermoplastic elastomer, silicone, polyurethane, polyvinyl chloride, or any soft, skin-like texture material.

FIG. 2A illustrates one embodiment for a masturbation container 202. In the exemplary embodiment, the masturbation container 202 has the following approximate dimensions: 7¾" height; 3½" top diameter with a ⅜" ridge; and 2½" bottom diameter. A lid 204 may be placed on top of the masturbation container 202. In some embodiments, the lid 204 may be used for many purposes, including but not limited to protection of the cast from damage, keeping the cast 208 and/or masturbation sleeve 702 (described in FIGS. 7 and 8) clean, or storage while not in use. A cap 206 may be placed on the bottom end of the masturbation container 202 to contain the masturbation sleeve 702. The cap 206 can also be used for other purposes, including but not limited to keeping the sleeve clean or for storage. In one embodiment, the masturbation container 202 has raised dotting located on the outside diameter to provide friction for gripping during masturbation.

FIG. 2B illustrates one embodiment of the masturbation container 202, the lid 204, the bottom cap 206, and the cast 208.

FIG. 2C illustrates one embodiment for the placement of the cast 208 on one end of the masturbation container 202. As shown in this embodiment, the cast 208 is placed at the top end of the masturbation container 202. The bottom protruding rim 214 of the cast 208 is placed below the ridge 216 of the masturbation container 202. The top protruding rim 212 of the cast 208 is placed above the ridge of the masturbation container. Through this positioning, the space 218 between the top protruding rim 212 and the bottom protruding rim 214, which is formed in the cast 208 during the casting process, fits over the ridge 216 of the masturbation sleeve 202. The top protruding rim 212 and bottom protruding rim 214 fitted over the ridge 216 hold the cast 208 in place during masturbation. In some embodiments, the cast 208 is removably attached to the masturbation container 202. The cast 208 may be removed for a variety of purposes, including but not limited to storage, interchanged for different casts, or prevention of damage. In yet other embodiments, the cast 208 is permanently attached to the masturbation container 202 by methods known in the art, such as body safe glue. FIG. 2C further shows one embodiment of the location of the vaginal opening 210 in the cast 208 with respect to the placement of the cast 208 on the masturbation container 202.

Figure 4:
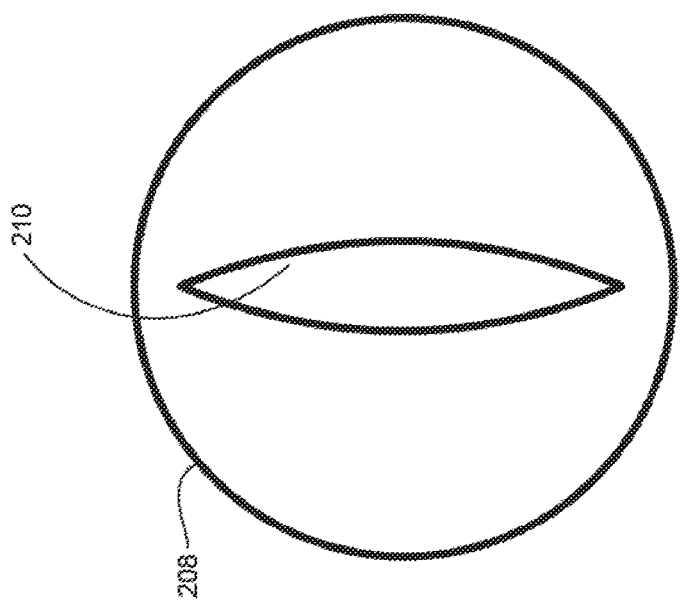
FIG. 4 shows an illustrative embodiment of a cast formed using the method.
Figure 3:
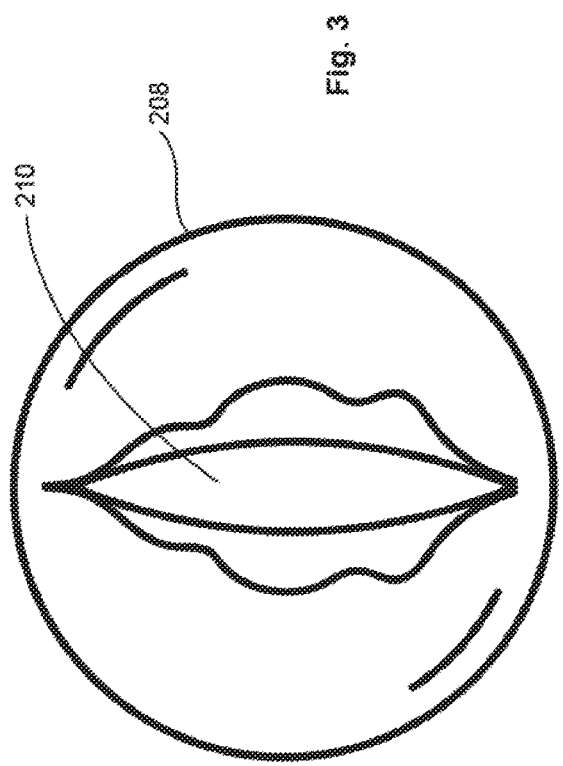
FIG. 3 shows an illustrative embodiment of a cast formed using the method.

FIGS. 3-4 show an illustrative embodiment of a cast 208 formed using the method disclosed above. FIG. 3 shows the top of the cast 208 of a vulva. As shown, the cast forms a replica of a vulva including all of the anatomical features of the vulva being replicated. Such features include but are not limited to the clitoral hood, outer labia, inner labia, and the vaginal opening 210. The vaginal opening 210 is formed by the use of the insert during the casting process or alternatively trimming after the cast 208 is complete. FIG. 4 shows the bottom of a cast 208 of vulva. In this embodiment, the bottom of the cast 208 is circular and flat with a vaginal opening 210. In yet another embodiment, the cast 208 may have different designs such as diamond, square, triangle, or other shape. In further embodiments, the bottom of the cast 208 may have a concave, convex, or other shape depending on the shape of the insert rather than being flat.

Figure 5A:
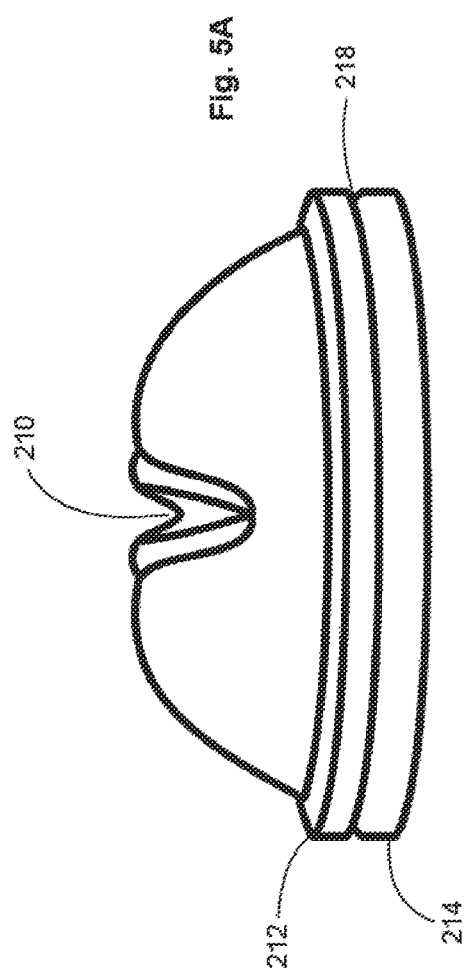
FIG. 5A shows an illustrative embodiment of a replica.

FIG. 5A shows an example of the replica formed in the cast 208 during the casting process. A space 218 is formed between a top protruding rim 212 and a bottom protruding rim 214 to fit over the ridge 216 (not shown) located in the masturbation container 202 (not shown). The space 218 in the illustrative embodiment is approximately ⅜" in depth to fit over the ⅜" ridge 216 (not shown) of the masturbation container (not shown).

Figure 5B:
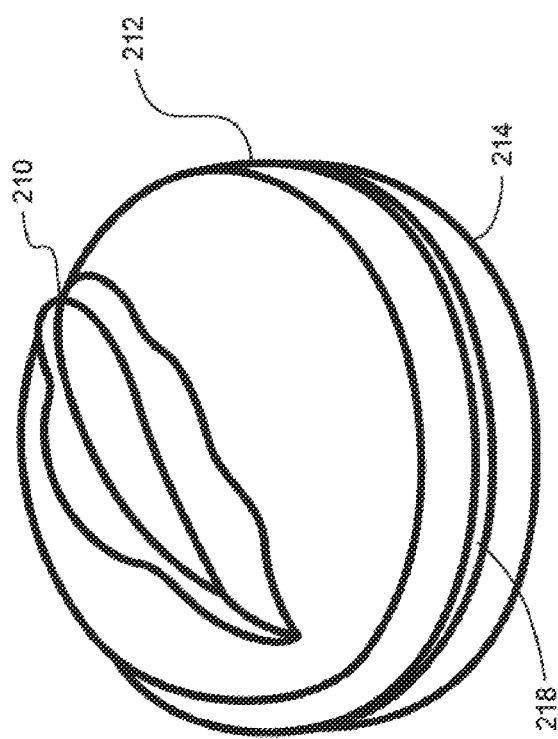
FIG. 5B shows an illustrative embodiment of a replica.

FIG. 5B shows an alternate view of an embodiment of the replica formed in the cast 208 during the casting process. A space 218 is formed between a top protruding rim 212 and a bottom protruding rim 214 to fit over the ridge 216 (not shown) located in the masturbation container 202 (not shown).

FIG. 6A illustrates an embodiment of an insert 602 placed in the center of mold during the casting process to maintain an opening. In this embodiment, the insert is a ball 604 attached to a thin card-like protrusion 606 with two straight side edges, diagonal corners and a straight line bottom. In other words, in this embodiment, the thin protrusion 606 is shaped like the bottom half of an octagon. The protrusion 606 has approximately the thickness of a credit card in this illustrative embodiment. Exemplary dimensions are shown in FIG. 6A. The ball section 604 of the insert has a diameter of approximately 2 3/10" (6 cm). The total length of the card-like protrusion 606 is approximately 2⅕" (5.5 cm) on the three sides. The measurement from the ball 604 to the top of the diagonal corner is approximately 9/10" (2.5 cm). The length of the bottom of the protrusion 606 is approximately 1⅖" (3.5 cm) from one diagonal corner to the other diagonal corner.

FIG. 6B illustrates an overhead view of the cast with an embodiment of the insert 602 placed in the center of the mold during the casting process to maintain an opening 210. In this embodiment, the insert 602 further has a ball portion 604 that forms a bowl impression in the cast 208 during the casting process.

FIG. 6C illustrates a view under the cast 208 with an embodiment of the insert 602 placed in the center of the mold during the casting process to maintain an opening 210. In this embodiment, the insert 602 has a ball portion 604 to form a bowl impression in the cast 208 during the casting process. Although not visible in FIG. 6C, the protrusion 606 is facing down forming an opening 210 during the casting process.

FIG. 6D illustrates an overhead view of the cast with an embodiment of an alternate insert 606 placed in the center of the mold during the casting process to maintain an opening 210.

One skilled in the art would understand that the impressions and openings made by the insert may vary with the size and shape to achieve the desired shape and functionality of the cast. For example, the insert may have any type of shape, including but not limited to circular, square, rectangular, diamond, or an octagon. Further, the insert may have additional parts protruding from the central shape to create additional openings, including but not limited to protrusions that are thin, thick, long, short, and with a variety of shapes such as those noted above.

Figure 8:
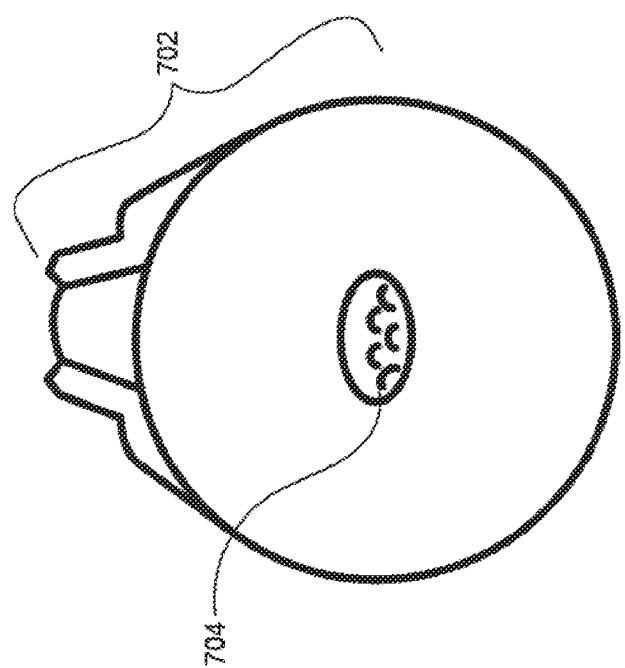
FIG. 8 shows an illustrative embodiment of a masturbatory sleeve.
Figure 7:
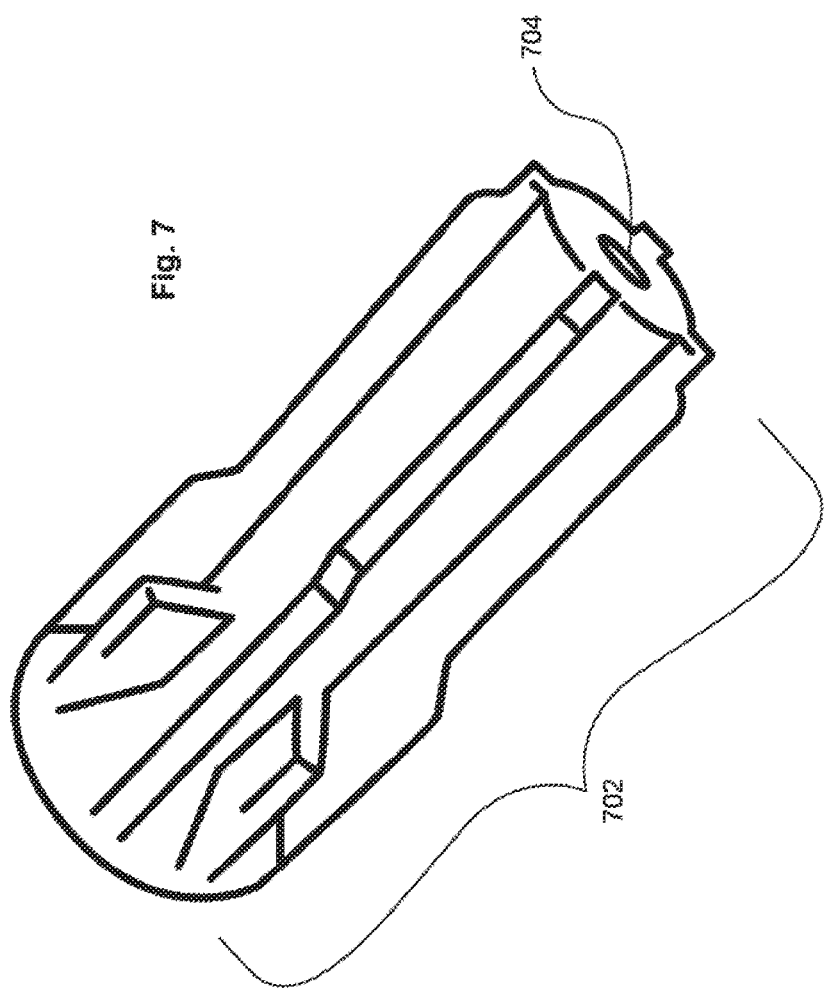
FIG. 7 shows an illustrative embodiment of a masturbatory sleeve.

FIGS. 7 and 8 show an example of a masturbation sleeve 702 that may be placed inside the masturbation container.

The masturbation sleeve 702 shown in FIGS. 7 and 8 is composed of thermoplastic elastomer with the following approximately dimensions: 7" height; 3⅖" top diameter, 2⅖" bottom diameter. The center of the masturbation sleeve 702 has an opening 704 simulating a body orifice, large enough to accommodate a human penis. Such an opening 704 will range in size from ¼" to 4" depending on the material's ability to stretch. FIG. 7 shows a lateral view of the masturbation sleeve 702. FIG. 8 shows the large diameter end, which the replica of the vulva is placed over. The placement allows the simulation of penetrating a vulva through the opening 210 in the cast and enter into the opening 704 in the masturbation sleeve 702, simulating a bodily orifice for purposes of masturbation.

One skilled in the art would understand that the size and shape of the masturbation container 202 and masturbation sleeve 702 may vary with the size and shape to achieve the desired shape and functionality of the cast. For example, the masturbation container 202 and masturbation sleeve 702 may have any type of shape, including but not limited to circular, square, rectangular, diamond, or an octagon. Further, the masturbation container 202 and the masturbation sleeve 702 contain additional parts that help a user to achieve different types of functionality or enjoyment.

Figure 10:
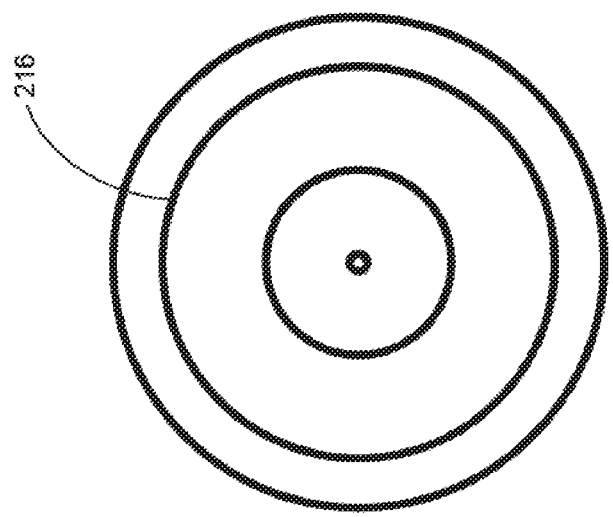
FIG. 10 shows an illustrative embodiment of a masturbation container.
Figure 9:
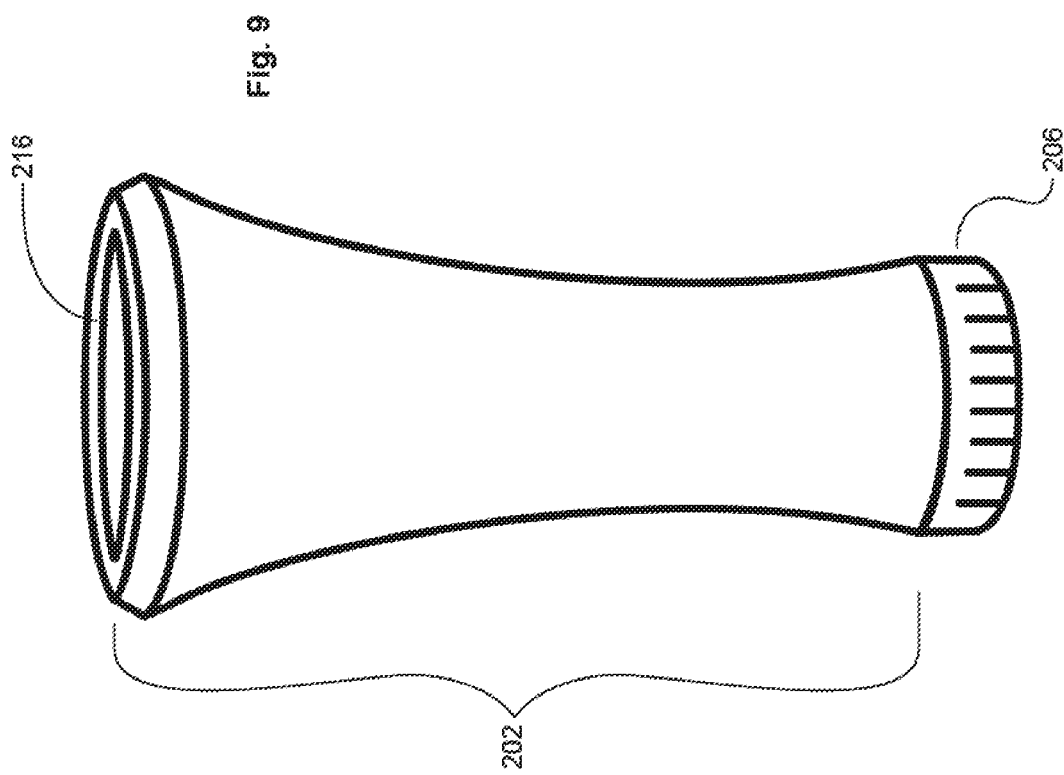
FIG. 9 shows an illustrative embodiment of a masturbation container.
Figure 12:
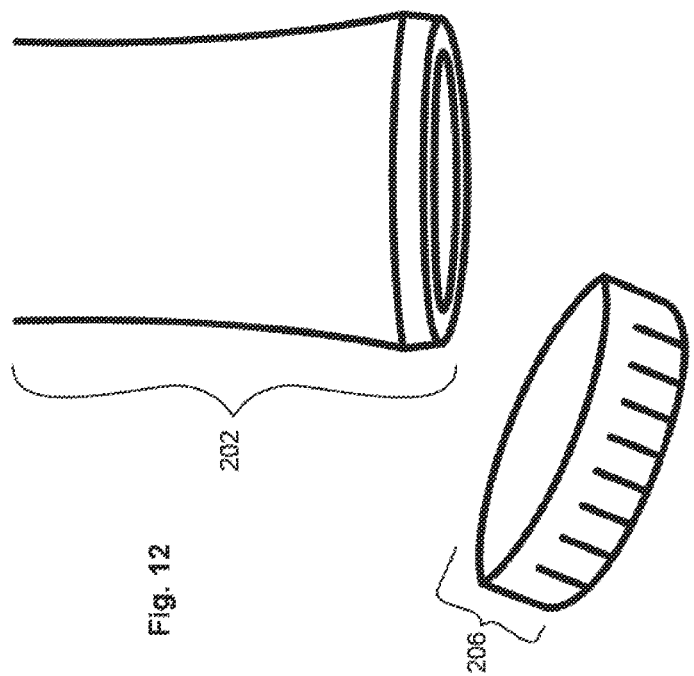
FIG. 12 shows an illustrative embodiment of a masturbation container and a lower lid.
Figure 11:
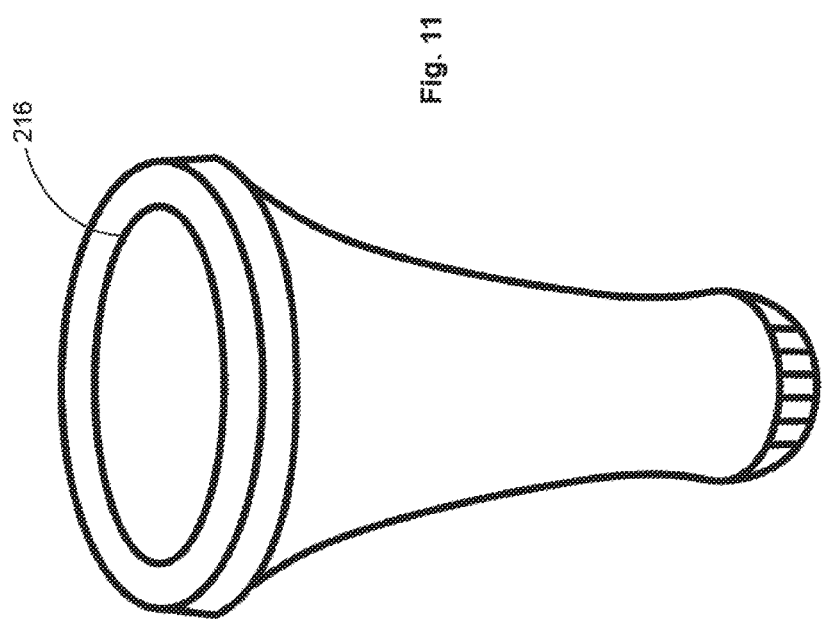
FIG. 11 shows an illustrative embodiment of a masturbation container.

FIGS. 9-12 show the illustrative embodiment of the masturbation container 202. FIG. 9 is of the side view of the masturbation container 202, which may or may not contain friction ridges. In this embodiment, the convex shape of the masturbation container is fashioned to allow at least one human hand to comfortably grip the masturbation container 202. A cap 206 may be placed on the bottom end as shown in FIG. 9. FIG. 10 is an overhead view of the ridge 216 of the masturbation container 202. FIG. 11 shows the ridge 216 over which the cast 208 is fitted. The ridge 216 of the hollow container in the illustrative embodiment is approximately ⅜" length and 0.20 mm thickness. The ridge 216 covers the entire inner circumference of the end of the masturbation container 202. FIG. 12 shows the bottom end of the masturbation container 202 formed to allow a cap 206 to be securely snapped on. In alternate embodiments, the cap 206 must be screwed in place.

FIG. 13A illustrates an embodiment for the optional stabilization of the vulva cast 208 on the masturbation container 202 with the use of a stabilizing cuff 1302. In this example, the cast 208 is placed on the top end of the masturbation container 202. Once the cast 208 is in place, the stabilization cuff 1302 is stretched over the cast 208 and the masturbation container 202, thereby allowing masturbation without fear of the cast being dislodged. The stabilization cuff 1302 in this example is formed of polypropylene with the following approximate dimensions: 3½" length, 1½" top diameter, 2" bottom diameter, 3" middle diameter, and 4 mm thickness. One skilled in the art will recognize that many different methods and apparatuses may be used to make sure the cast 208 and the masturbation sleeve 702 remain connected.

FIGS. 13B and 13C illustrate an embodiment on the placement of the optional stabilization cuff 1302 placed over the cast 208 with the cast opening 210 placed in the center of the optional stabilization cuff 1302.

It will be appreciated that variants of the above-disclosed and other features and functions, steps, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for forming a replica of a vulva, comprising:
   a body-safe molding composition comprising a solvent and a body-safe molding formula;
   a mold formed from the body-safe molding composition;
   an insert comprising a ball portion and a protrusion portion extending outward from the ball portion, the insert configured to be joined with the mold, the ball portion of the insert configured to support the mold when the insert and the mold are joined and the protrusion portion of the insert configured to create an opening in the mold when the insert and the mold are joined;
   a base container configured to receive the insert joined with the mold;
   a hollow container having a height greater than a height of the mold, the hollow container configured to connect to the base container and surround the insert joined with the mold, wherein the connection between the hollow container and the base container forms a seal configured to substantially prevent leakage of a casting formula;
   a ridge formed on an inside surface of the hollow container, the ridge configured to define a space in a cast formed over the mold; and
   a casting formula configured to be poured into the hollow container, the casting formula having a volume configured to cover the ridge and the mold but not exceed the top of the protrusion portion of the insert.

2. The system of claim 1, wherein the body-safe molding composition comprises a powder.

3. The system of claim 2, wherein the powder comprises alginate.

4. The system of claim 1, wherein the casting formula has a weight of approximately 5 ounces.

5. The system of claim 1, further comprising a masturbation container.

6. The system of claim 1, further comprising a stabilizing cuff.

7. The system of claim 1, further comprising a masturbation sleeve.

8. The system of claim 1, wherein the ball portion of the insert has a diameter of approximately 6 cm.

9. The system of claim 8, wherein the protrusion portion of the insert has a height extending outward from the ball portion, wherein the height is approximately 2.5 cm.

10. The system of claim 9, wherein the protrusion portion of the insert has a width extending across the ball portion, wherein the width is approximately 3.5 cm.

* * * * *